US008159983B2

(12) United States Patent
Tao et al.

(10) Patent No.: US 8,159,983 B2
(45) Date of Patent: *Apr. 17, 2012

(54) COMMUNICATING PACKETS IN A WIRELESS MULTI-USER MULTI-HOP RELAY NETWORKS

(75) Inventors: Zhifeng Tao, Allston, MA (US); Koon Hoo Teo, Lexington, MA (US); Toshiyuki Kuze, Kanagawa (JP); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/593,358

(22) Filed: Nov. 6, 2006

(65) Prior Publication Data

US 2008/0107061 A1 May 8, 2008

(51) Int. Cl.
*H04H 20/71* (2008.01)
(52) U.S. Cl. ........ 370/312; 370/330; 370/338; 370/469; 370/328; 455/410; 455/455
(58) Field of Classification Search .............. 370/18, 370/338, 315, 469, 234, 399, 392, 331, 203, 370/343, 319, 330, 312, 328; 455/435, 16, 455/550.1, 428, 410, 455
See application file for complete search history.

(56) References Cited

U.S. PATENT DOCUMENTS

| 6,542,490 | B1 * | 4/2003 | Ahmadvand et al. | 370/338 |
|---|---|---|---|---|
| 2002/0037719 | A1 * | 3/2002 | Ariga et al. | 455/423 |
| 2003/0026222 | A1 | 2/2003 | Kotzin et al. | |
| 2003/0086393 | A1 * | 5/2003 | Vasudevan et al. | 370/330 |
| 2004/0179475 | A1 * | 9/2004 | Hwang et al. | 370/229 |
| 2006/0056443 | A1 * | 3/2006 | Tao et al. | 370/469 |
| 2008/0107061 | A1 * | 5/2008 | Tao et al. | 370/315 |

FOREIGN PATENT DOCUMENTS

WO 2006/115999 11/2006

OTHER PUBLICATIONS

IEEE Standard 802.16—2004 Part 16: Air Interface for Fixed Broadband Wireless Access Systems.*
IEEE C802.16E-05/321 Corrections to compressed and reduced private maps for OFDM □□Source(s): Rainer Ullmans, Jonathan Labs; Wavesat Inc. Jul. 14, 2005.*
IEEE Standard 802.16—2004 Part 16: Air Interface for Fixed Broadband Wireless Access Systems.*
IEEE C802.16E-05/321 Corrections to compressed and reduced private maps for OFDM Source(s): Rainer Ullmans, Jonathan Labs; Wavesat Inc. Jul. 14, 2005.*
802.16 for IEEE Standard for Local and Metropolitan Area Networks, Oct. 1, 2004 pp. 35-127 and 493-550.
802.16e Amendment 2 for IEEE Standard for Local and Metropolitan Area Networks, Feb. 28, 2006 pp. 18-175 and 353-513.

* cited by examiner

*Primary Examiner* — Kamran Afshar
*Assistant Examiner* — Manpreet Matharu
(74) *Attorney, Agent, or Firm* — Dirk Brinkman; Gene Vinokur

(57) ABSTRACT

A method communicates packets in a relay network. Multiple packets are communicated between a set of mobile stations and a relay station using a set of connections. There is one connection between each mobile station and the relay station. The multiple packets are aggregated on single connection between the relay station and a base station.

16 Claims, 12 Drawing Sheets

100

200

```
DL_MAP_IE() {
    DIUC
    if (DIUC == 14) {
        ...
    } else {
        if (INC_CID == 1) {
            N_CID
            for (n = 0; n < N_CID; n++ ) {
                if (included in SUB-DL-UL-MAP) {
                    RCID_IE()
                } else {
                    CID
                }
            }
            OFDMA symbol offset
            ...
```

Fig. 5
Prior Art

```
UL_MAP_IE() {
    CID
    UIUC
    if (UIUC == 11) {
        ...
    } else {
        Duration
        Repetition coding indication
        if (AAS or AMC UL Zone) {
            Slot offset
        }
    }
}
```

*Fig. 6*

```
UL_MAP_IE() {
    CID
    UIUC (set to 11)
    if (UIUC == 11) {
        Extended-2 UIUC (set to 0x09)
        Length
        N_CID (8 bits)
        for ( n = 0; n < N_CID; n++ ) {
            CID;
        }
    }
}
```

*Fig. 7*

| UL_MAP_IE() { |
| --- |
| N_CID (8 bits) |
| for (n=0; n < N_CID; n++) { |
| CID |
| } |
| UIUC |
| if (UIUC == 11){ |
| ... |

Fig. 8

| Syntax | Size (bit) | Notes |
|---|---|---|
| HT | 1 | Set be set to 0 |
| EC | 1 | Encryption control<br>0 = payload is not encrypted<br>1 = payload is encrypted |
| Type | 6 | Indicate the presence or absence of certain subheaders and other features.<br>On the relay link, the most significant bit shall be interpreted as indication of MSDU aggregation. |
| ESF | 1 | Extended subheader field.<br>0 = Extended subheader is absent<br>1 = Extended subheader is present |
| CI | | CRC indicator<br>1 = CRC is included in the MPDU<br>0 = CRC is not included |
| EKS | 2 | Encryption key sequence<br>The index of |
| Rsv | 1 | Reserved |
| LENGTH | 11 | The length in bytes of the MPDU including the MAC header and the CRC if present |
| CID | 16 | Connection identifier |

Fig. 11

COMMUNICATING PACKETS IN A WIRELESS MULTI-USER MULTI-HOP RELAY NETWORKS

FIELD OF THE INVENTION

This invention relates generally to wireless multi-user mobile networks, and more particularly to wireless mobile multi-user, multi-hop networks.

BACKGROUND OF THE INVENTION

Orthogonal frequency-division multiplexing (OFDM) is a modulation technique used at the physical layer (PHY) of a number of wireless networks, e.g., networks designed according to the IEEE 802.11a/g, and IEEE 802.16/16e standards. OFDMA is a multiple access scheme based on OFDM. In OFDMA, separate sets of orthogonal tones (subchannels) and time slots are allocated to multiple transceivers (users) so that the transceivers can communicate concurrently. As an example, the IEEE 802.16/16e standard, has adopted OFDMA as the multiple channel access mechanism for non-line-of-sight (NLOS) communications at frequencies below 11 GHz.

FIG. 1A shows a conventional OFDMA-based cellular network 100, e.g., a wireless network according to the IEEE 802.16/16e standard, incorporated herein by reference. The network confines operations to a point-to-multipoint topology, wherein only two types of network entity exist, namely base stations (BS), and mobile stations (MS). The BS manages and coordinates all communications with the MS in a particular cell on connections 101-103. Each MS is in direct communication with only the BS, and only the BS communicates with an infrastructure 110 or "backbone" of the network. That is, there is only one hop between the MS and the BS. All communications between the MS must pass through the BS. Furthermore, there is one connection between the BS and each MS.

Due to significant loss of signal strength along the connection for certain spectrum, the coverage area of wireless service is often of limited geographical size. In addition, blocking and random fading frequently results in areas of poor reception, or even dead spots. Conventionally, this problem has been addressed by deploying BSs in a denser manner. However, the high cost of BSs and potential increase in interference, among others, render this approach less desirable.

As shown in FIG. 1B for an alternative approach, a relay-based network 150 can be used. The network includes multiple mobile stations (MS) and/or subscriber stations (SS). A relatively low-cost relay station RS extends the range of the BS. Some of the stations (MS1 and SS1) communicate directly with the BS using connections C1 and C2. Other stations (MS2, MS3 and SS2) communicate directly with the RS using connections C3, C4 and C5, and indirectly with the BS via corresponding connections 151 using two hops. Obviously, communications on the link between the RS and BS (relay link) can become a bottleneck.

To improve efficiency, the manner of communicating between the relay and base station needs to be improved.

SUMMARY OF THE INVENTION

A method communicates packets in a relay network. Multiple packets are communicated between a set of mobile stations and a relay station using a set of connections. There is one connection between each mobile station and the relay station. The multiple packets are aggregated on single connection between the relay station and a base station.

BRIEF DESCRIPTION OF THE DRAWINGS

FIG. 5 is a block diagram of a format of a prior art DL_MAP_IE;

FIGS. 6-8 are block diagrams of formats of UL_MAP_IE according to embodiments of the invention;

FIG. 11 is a definition table of the EP-SH message according to an embodiment of the invention;

DETAILED DESCRIPTION OF THE PREFERRED EMBODIMENTS

Definitions

For the sake of clarify and description of the invention the following terms are defined and used accordingly herein.

Base Station (BS)

Equipment to provide wireless communication between subscriber equipment and an infrastructure or network backbone.

Subscriber Station (SS)

A generalized equipment set to provide communication between the subscriber equipment and the base station (BS).

Mobile Station (MS)

A wireless transceiver intended to be used while in motion or at unspecified locations. The MS is always a subscriber station (SS) unless specifically specified otherwise.

Relay Station (RS)

A wireless transceiver whose function is to relay data and control information between other stations, and to execute processes that support multi-hop communications.

Connection

At a physical layer, a connection runs from an RF transmitter of a station via one or more transmit antennas through a wireless channel to an RF receiver of another station via one or more receive antennas. Physically, the connection communicates RF signals using a predetermined set of subchannels and time slots. At a logical layer, the portion of interest of the connection runs from a media access layer (MAC) of a protocol stack in the transmitter to the media access layer in the receiver. Logically, the connection caries the data and control information as a single bit stream.

MAC Service Data Unit (MSDU)

A set of data specified in a protocol of a given layer and including of protocol control information of that layer, and possibly user data of that layer.

MAC Protocol Data Unit (MPDU)

A protocol data unit of a given layer of a protocol including the service data unit coming from a higher layer and the protocol control information of that layer. A burst is a sequence of contiguous MPDUs that belong to the same connection.

Network Structure

Figure 2:
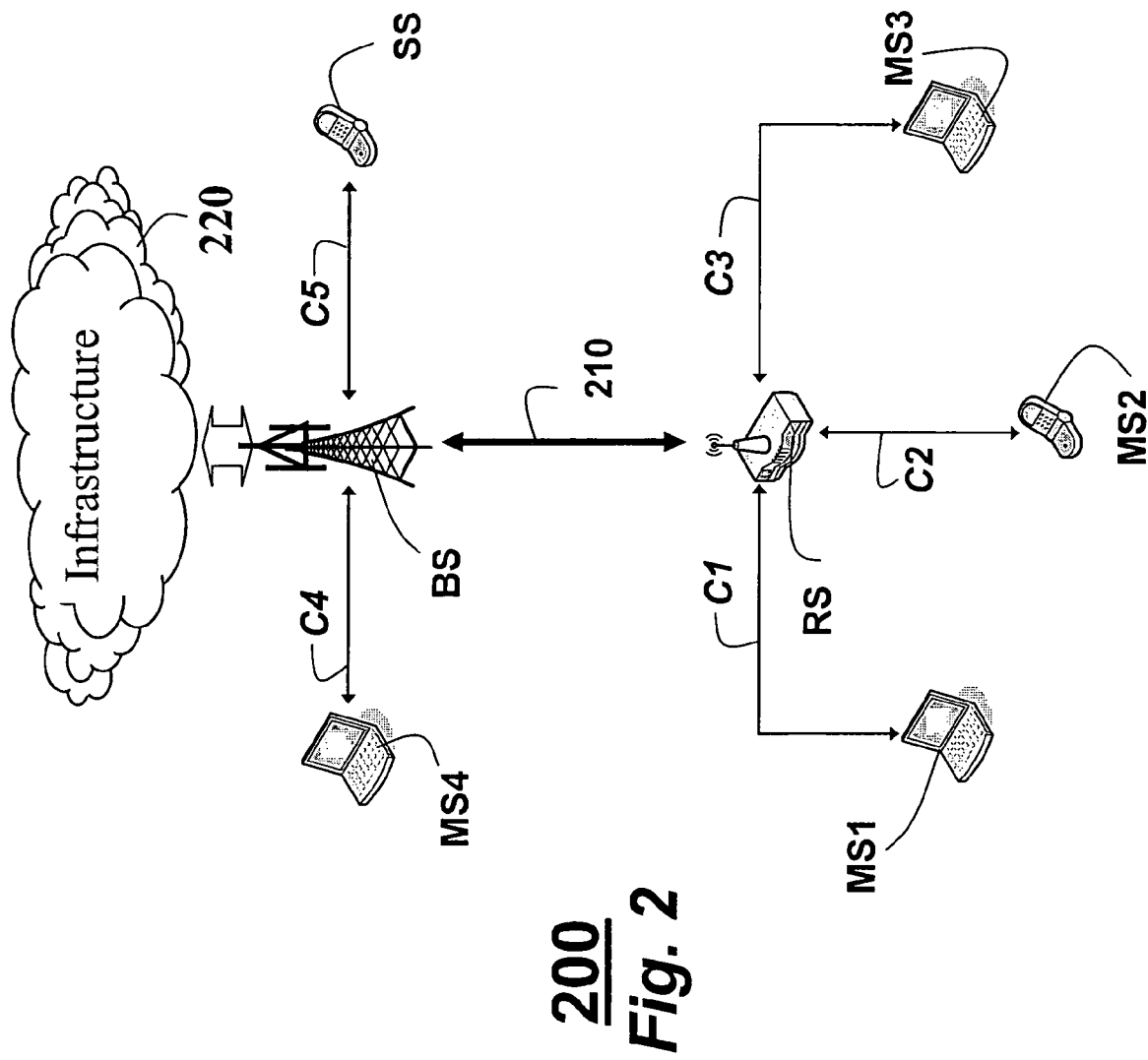
FIG. 2 is a schematic of a wireless mobile relay network according to an embodiment of the invention.

As shown in FIG. 2 for one embodiment of the invention, a network 200 communicates packets from a set of mobile stations (MS) to a relay station (RS) using a set of connections (C1, C2, C3). There is one connection between each mobile station and the relay station. The relay station and a base station (BS) using a single connection 210 to communicate the packets. The BS can also communicate with other MS and SS using direct connections C4 and C5. The BS can communicate with an infrastructure 220.

The packets can be communicated using OFDMA, which uses a predetermined set of frequencies and time periods. Time is partitioned into contiguous frames. Each frame can include a downlink (DL) and an uplink (UL) subframe. The basic unit of resource for allocation is a slot, which includes a number of OFDMA symbols in the time domain, and one subchannel in the frequency domain.

Figure 3:
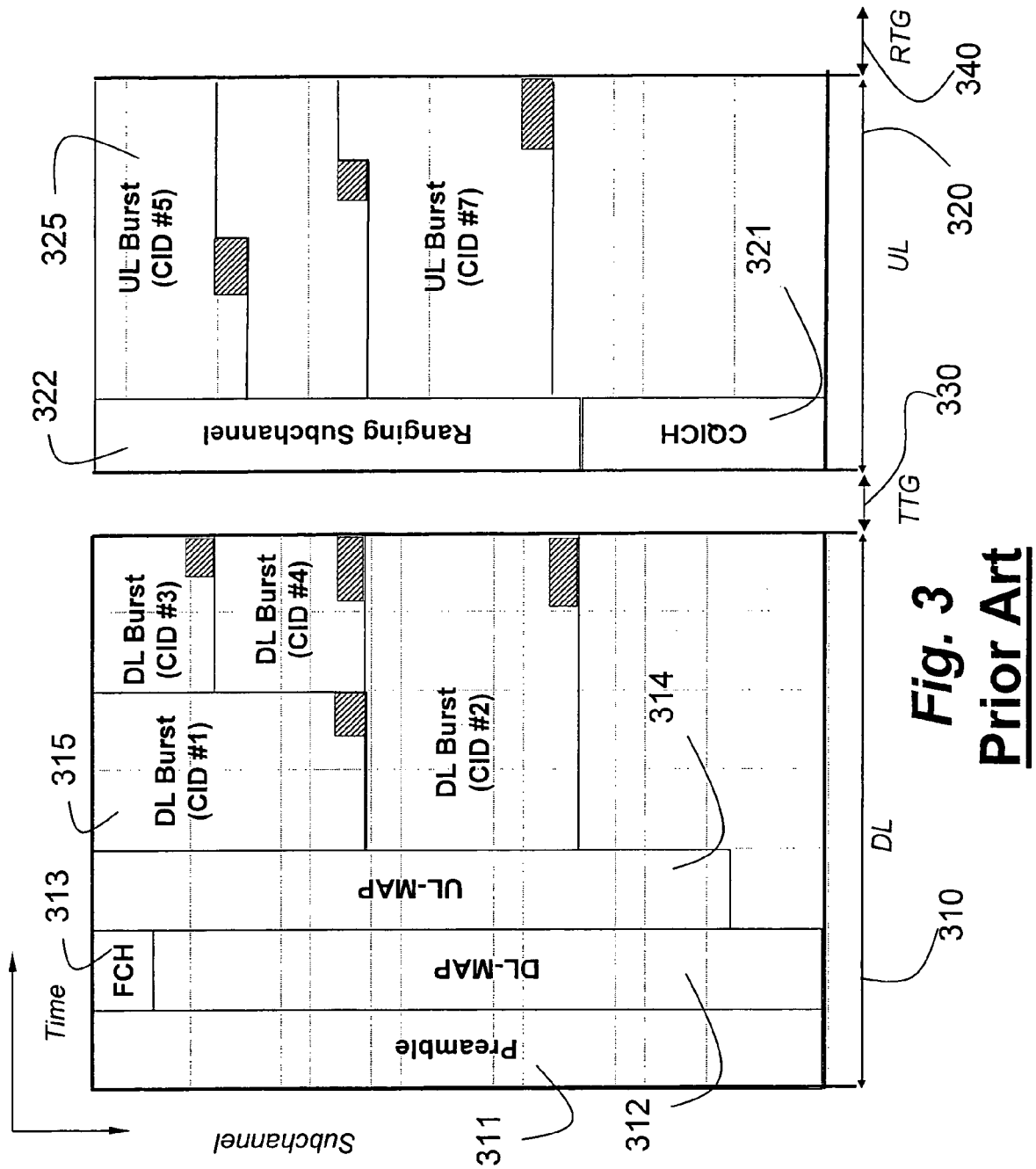
FIG. 3 is a block diagram of a prior art OFDMA frame.

FIG. 3 shows conventional DL 315 and UL 326 subframes. The frames are described in greater detail in the related application. The frames are reproduced and described in detail in the IEEE 802.16e standard, incorporated herein by reference. The DL subframe begins with a preamble 311. The preamble 311 is used for synchronization and channel estimation at the MS/SS. In the OFDMA symbol that immediately follows the preamble, the BS transmits a downlink MAP (DL-MAP) 312, a frame control header (FCH) 313, and an uplink MAP (UL-MAP) 314 message to notify MS/SS of the corresponding resources allocated (schedule) to the MS/SS in the DL and UL, respectively, within the current frame. Based upon the schedule received from the BS, the MS/SS can determine when, e.g., OFDMA symbols, and where, e.g., subchannels, to receive in DL subframe and transmit in UL subframe, respectively. The connections used have an identification CID.

The UL subframe begins with a ranging subchannel 322 and channel quality indicator (CQICH) 321.

Corresponding time gaps, e.g., TTG 330 and RTG 340, are inserted between two consecutive subframes. The time gaps enable the transceiver to switch between transmit and receive modes.

It is understood that packets are "spread" over the subcarriers and time slots of the frames.

According to the IEEE 802.16 standard, there is a unidirectional mapping established and maintained between the BS and the MS/SS medium access control (MAC) layers for the purpose of communicating a service flow bit stream (traffic). All traffic is carried on connections, even if the service flows is implemented with a connectionless protocol, e.g., IP.

Figure 1A:
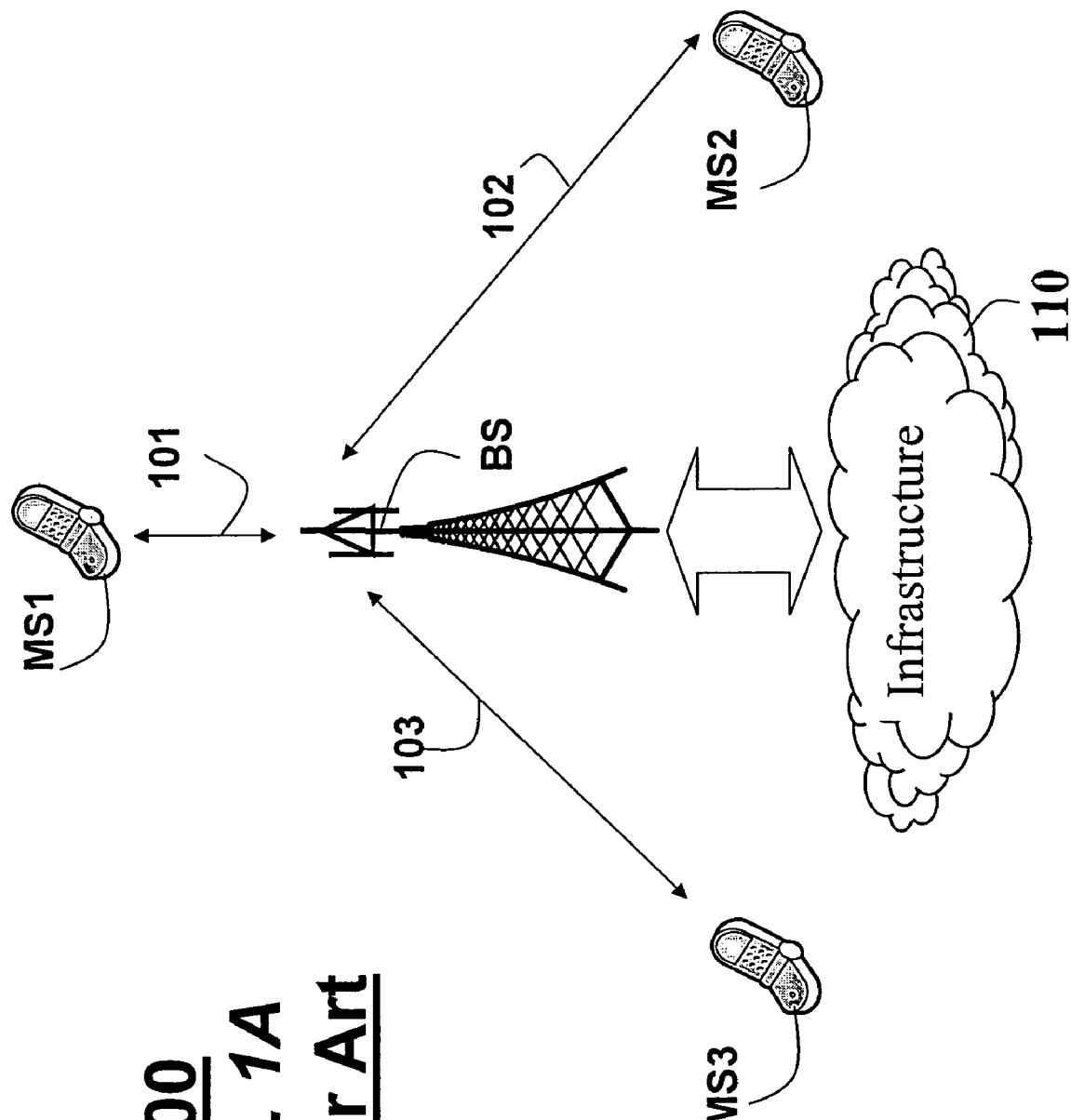
FIG. 1A is a schematic of a prior art wireless mobile networks.

In the conventional point-to-multipoint (PMP) network as shown in FIG. 1A, resource allocation is performed by BS on a per connection basis, and all the MSs are treated substantially equally. This makes sense for moderately sized, single-hop PMP network. However, as the number of connections increases, the overhead can decrease the MAC efficiency by as much as 50%. There are two primary reasons for the degradation.

First, the resource allocated to each connection cannot be fully used because the actual data bits do not map exactly to the assigned OFDMA symbols and subchannels. Due to this mapping inefficiency, padding bits need to be appended at the end of the packet, leading to resources waste as shown shaded in FIG. 3.

Figure 1B:
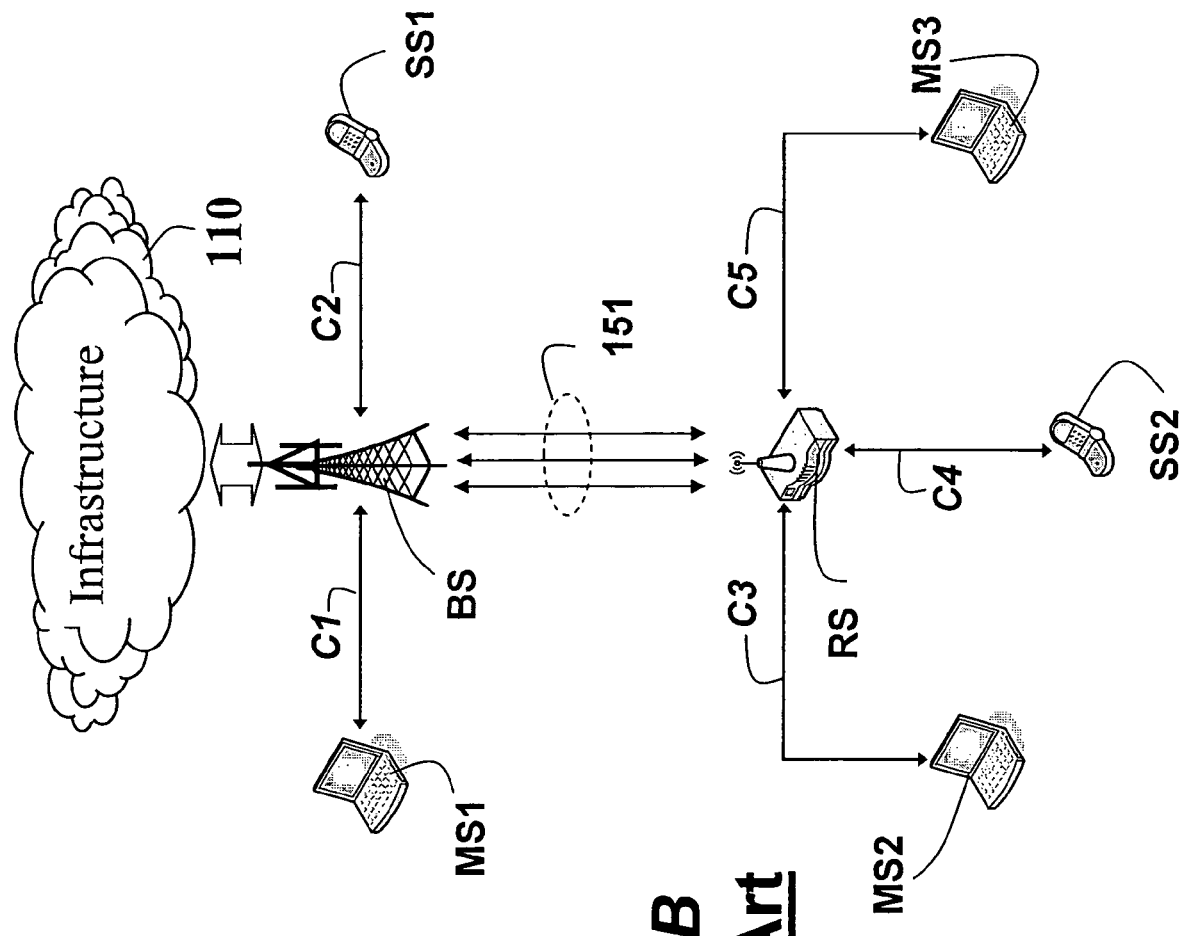
FIG. 1B is a schematic of a prior art wireless mobile relay network.

Second, one DL MAP information element (DL MAP IE) normally contains the schedule for one connection only. Even worse, UL MAP information element can only contain the schedule for one connection. This design becomes cumbersome and inefficient as the number of connections increases. The abovementioned problem is exacerbated when the current IEEE 802.16e OFDMA protocol is applied to the connections 151 between the BS and the RS in the relay network of FIG. 1B, or between a pair of RSs, because a significant number of connections are present here.

Therefore, to improve the efficiency of the IEEE 802.16e protocol in relay networks we make the following improvements.

First we aggregate the connections between the MSs and the RS into a single aggregated connection (relay link) 210 between the RS and BS as shown in FIG. 2.

Figure 4:
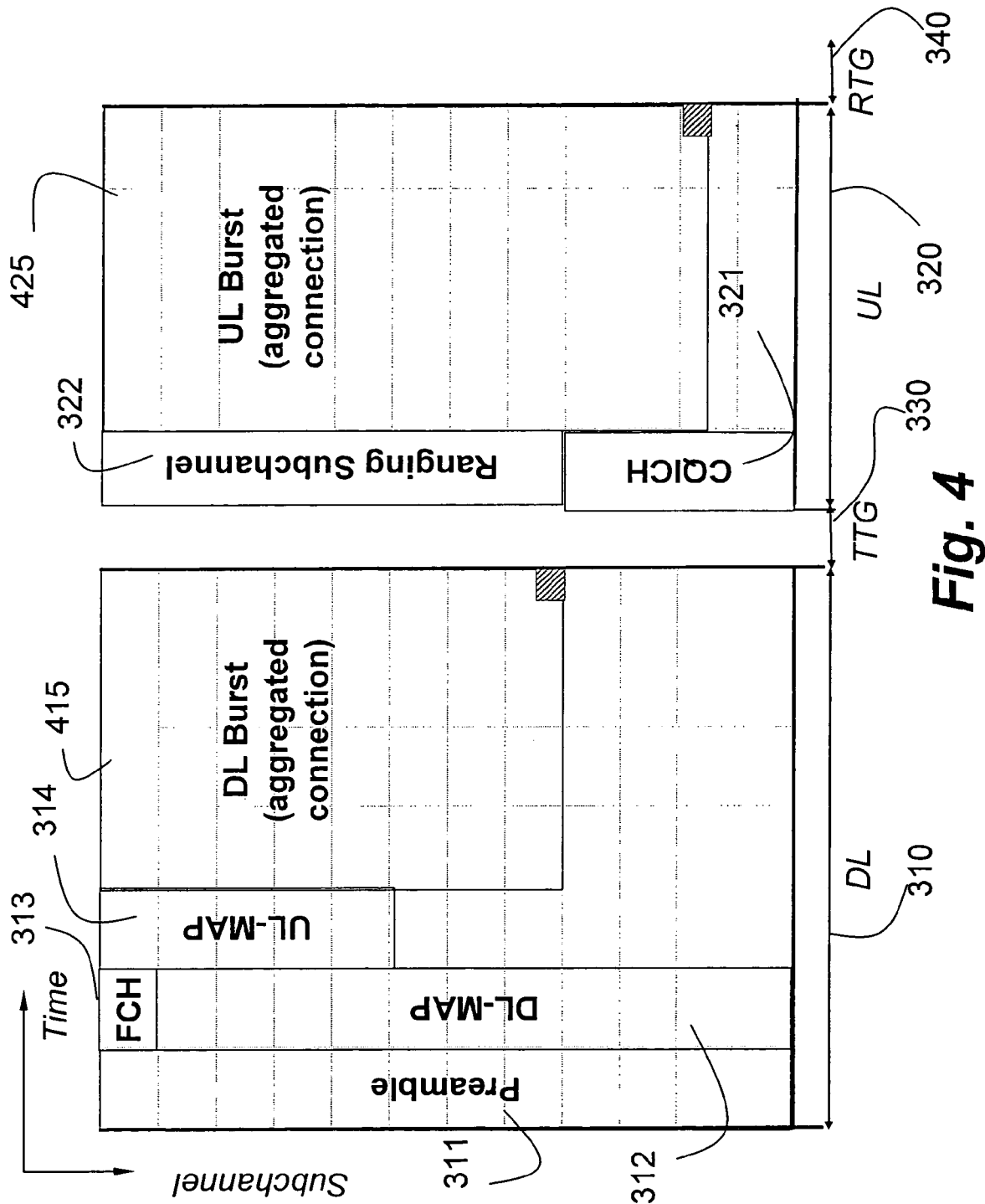
FIG. 4 is a block diagram of an OFDMA frame according to an embodiment of the invention.

Second, we concatenate MPDU packets as shown in FIGS. 4-9. Note, the decrease in wasted resources (shaded). FIG. 4 specifically shows the aggregation and concatenation. As defined herein, a burst (415 and 425) is a sequence of contiguous MPDUs that belong to the same connection.

Figure 9:
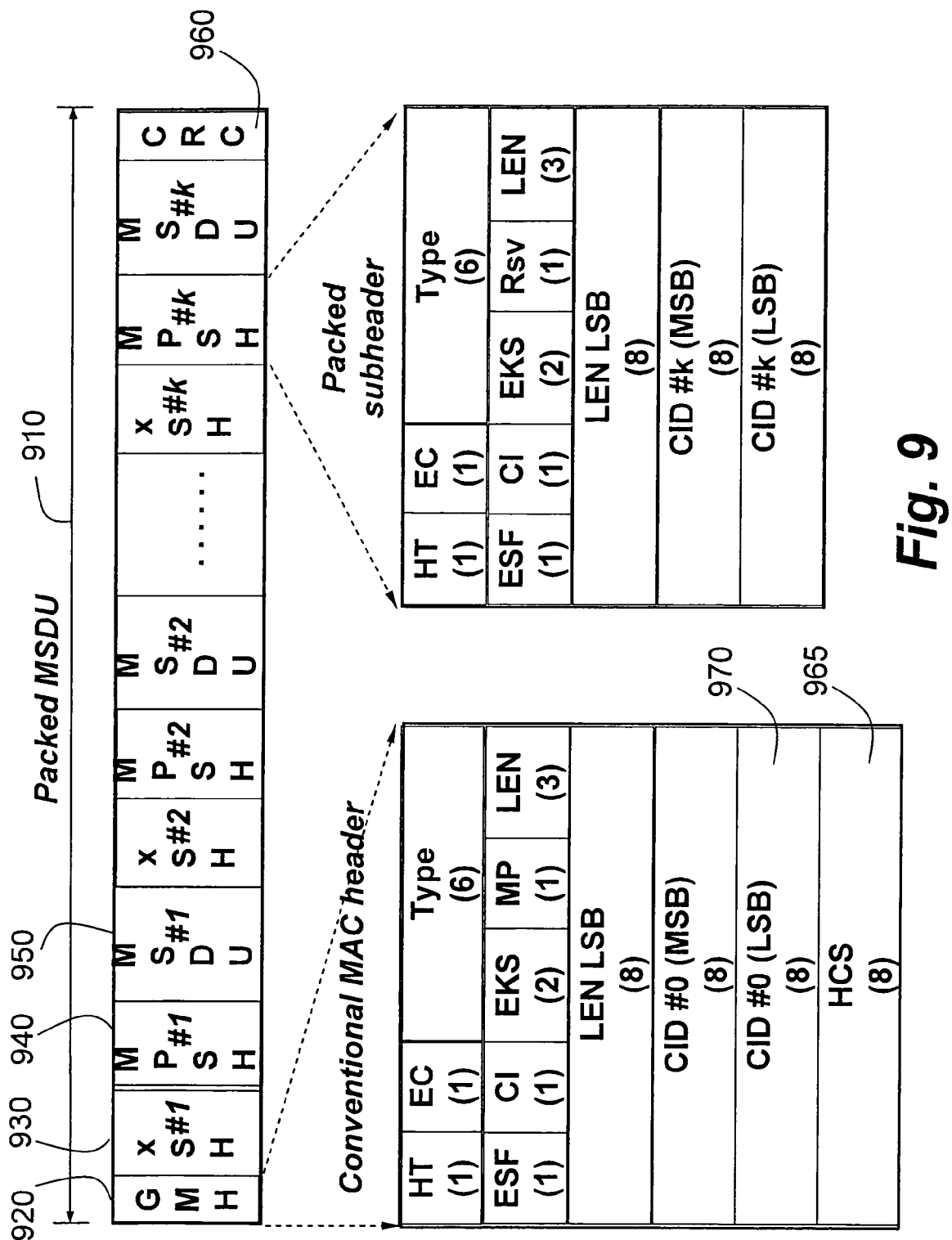
FIG. 9 is a block diagram of a format of enhanced packing according to an embodiment of the invention.

Third, we pack MSDU packets as shown in FIG. 9.

Enhanced MPDU Concatenation

With MPDU concatenation, multiple sequential MPDUs are concatenated into a single transmission burst in either the uplink or downlink direction, regardless of whether the MPDUs belong to the same connection or not. FIG. 5 shows format of the DL MAP IE according to the conventional IEEE 802.16 standard. Field CID stores the connection identification. In the uplink, allocations for conventional data traffic are specified as duration in slots, whereas the starting point for allocation is determined based upon the prior allocation appearing in the UL-MAP.

In order to carry identifiers of multiple connections (CIDs) in a single information element (IE), we modify the UL MAP IE as shown in FIGS. 6 and 7. The details of the fields are described in the standard. Multiple connections can be accomplished, while backward compatibility is also maintained. For the sake of brevity, all the following description is in terms of communications occurring between the RS and BS, unless otherwise noted.

Whenever appropriate, the RS can aggregate a set of connections with the same QoS requirement from multiple MSs into a single connection to the BS. To convey resource allocation information associated with this set of connections, the UL_MAP_IE shown in FIG. 6 should appear first in the UL-MAP message. The CID field contains the identifier of the corresponding connection established on the relay link between the RS and BS, while the Duration field covers the total resources allocated to all the connections belonging to this logical set.

Any MS that communicates directly with the BS can still decode the UL_MAP_IE of FIG. 6, and thus calculate the starting point of the resource given to itself.

The UL_MAP_IE of FIG. 6 is followed by the UL MAP of FIG. 7, which indicates the identifier of all the individual connections that are covered by the preceding UL_MAP_IE of FIG. 6. Because the UL_MAP_IE of FIG. 7 follows the UL MAP extended-2 IE format specified in the IEEE 802.16e standard, all conventional MS simply skip this information element upon reception, and thus backward compatibility is provided.

If backward compatibility is not a concern, e.g., all the MSs/SSs understand the protocol according to the invention, a more efficient UL_MAP_IE can be devised as shown in FIG. 8. The design of this UL_MAP_IE closely follows the same approach used by the IEEE 802.16e to extend the DL_MAP_IE. Two sets of new subfields are provided.

The first new subfield, which is placed at the beginning of the UL_MAP_IE of FIG. 8 is the N_CID, which indicates the number of connection identifiers carried by this information element (IE). The N_CID subfield is immediately followed by N_CID number of the CIDs, to which this UL_MAP message allocate resources.

The UL_MAP_IE according to the invention, as shown in FIGS. 6-8, in conjunction with the conventional DL_MAP_IE of FIG. 5, can provide necessary and sufficient signaling support to accommodate multiple connections. Thus, MPDU concatenation can be enabled in the data plane to achieve higher efficiency on the relay link between the RS and the BS. As qualitatively shown in FIG. 4, the total management plane overhead, e.g., UL_MAP_IE, etc., and overhead caused by mapping inefficiency experience an appreciable reduction, thus resulting in MAC protocol efficiency improvement.

Enhanced MSDU Packing

The packing mechanism defined in the conventional IEEE 802.16/16e standard essentially is an MSDU packing. However, that packing confines its scope to only MSDUs from the same connection. This poses a highly restrictive constraint particularly on the single connection 210 on the relay link between the RS and BS according to the connection aggregation as described above.

In order to relax the restriction imposed by conventional packing mechanism and extend the applicability of packing at MSDU level, we provide a new mobile multihop relay (MMR) packing for communication on the relay link. As shown in FIG. 9, the packed MSDU 910 starts with a general MAC header (GMH) 920, followed by various enhanced packing subheaders (EPSH see FIG. 11), conventional subheaders (xSH) 930, and the individual MSDU 950. The EP, i.e., MMR MSDU packing, subfield, indicates that the current MPDU contains packed MSDUs using the enhanced packing scheme, and the corresponding enhanced-packing subheader (EP-SH) as well.

It is evident that the EP-SH and the conventional header bear appreciable resemblance. Indeed, the only subfields that EP-SH can eliminate from the conventional MAC header are header checksum (HCS) 965 and the cyclic redundancy check (CRC) 960. All other subfields are retained, as many configurations, e.g., security protection, encryption key, MSDU length, and CID 970, can vary on a per MSDU basis.

The output of the conventional packing process, namely a packed MSDU, can also participate in the enhanced MSDU packing. In this case, one enhanced packing subheader (EP-SH) is placed directly in front of the first subheader for conventional packing (PSH) of the packed MSDU. As a result, the MPDU can contain both packing subheaders (PSH) and enhanced packing subheader (EP-SH).

Figure 10:
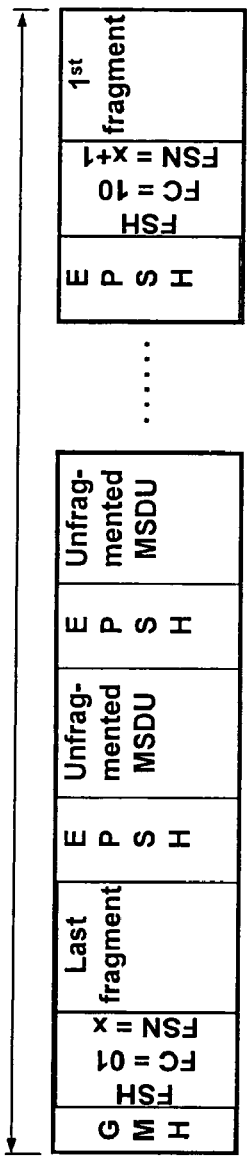
FIG. 10 is a block diagram of a format of enhanced packing with fragmentation according to an embodiment of the invention.
Figure 10:
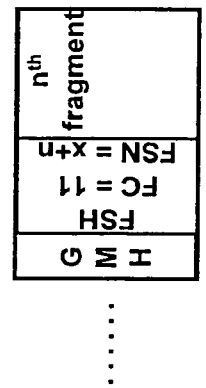
Figure 10:
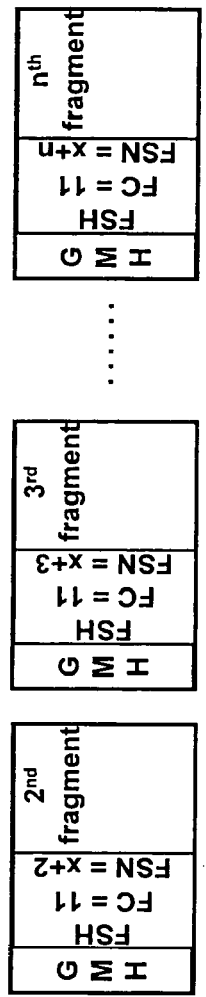
Figure 10:
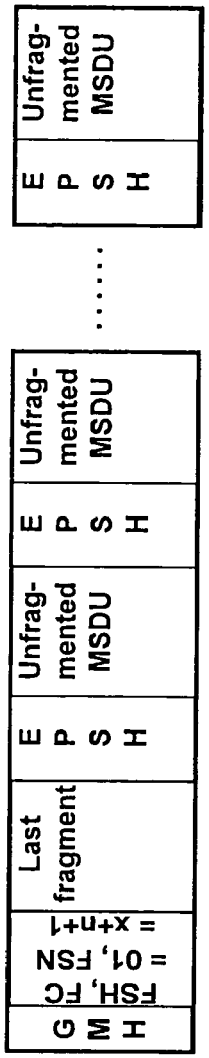

Enhanced MSDU packing can also co-exist with fragmentation. As shown in FIG. 10, EP-SH appears only once for an MSDU to be fragmented, and should be inserted in front of the fragmentation subheader (FSH) of the first fragment. The relation between EP-SH and FSH described above also applies for an ARQ-enabled connection, as such connection should be managed as if fragmentation was enabled, regardless of whether fragmentation is actually enabled or not in reality.

Alternatively, we can use the most significant bit, i.e., bit #5) of the typefield in conventional generic MAC header (GMH) to indicate the presence of enhanced packing subheader (EP-SH). As another option to signal the existence of EP-SH is to use a combination value of the six-bit long typefield.

Moreover, as the enhanced packing subheader (EP-SH) contains a comprehensive set of information, it is possible to support a rich set of additional functions, such as attaching CRC on a per MSDU basis, etc.

The detailed definitions of the EP-SH is shown in FIG. 11.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating packets in a relay network from a set of subscriber stations to a base station through a set of relay stations, comprising a relay station for performing steps of the method, comprising the steps:

receiving a plurality of packets from a set of subscriber stations using a set of logical connections, in which the plurality of packets include media access control (MAC) protocol data unit (MPDU) and MAC service data unit (MSDU) packets, there being at least one logical connection between each subscriber station and the base station, and further using a set of physical connections, there being at least one physical connection between each subscriber station and the relay station;

aggregating the set of logical connections between each subscriber station and the base station into a single MPDU packet on the logical connection between the relay station and the base station, such that the single logical connection includes MSDU packets that belong to different logical connections for different subscriber stations;

aggregating the plurality of packets into a single bit stream; and transmitting the single bit stream to a base station using a single physical connection and the single logical connection.

2. The method of claim 1, in which the plurality of packets have identical quality of service requirements.

3. The method of claim 1, further comprising:
allocating resources for the single connection in the base station.

4. The method of claim 1, further comprising:
allocating resources for the single connection in the relay station.

5. The method of claim 1, in which consecutive extended uplink media access protocol information elements (UL_MAP_IEs) are used to communicate uplink resource allocation information related to the set of connections.

6. The method of claim 1, in which a single extended uplink media access protocol information element (UL_MAP_IE) is used to communicate uplink resource allocation information related to the set of connections.

7. The method of claim 6, in which a connection identifier (CID) field of the UL_MAP_IE identifies the single connection, and a duration field of the UL_MAP_IE indicates a total amount of resources allocated to the set of connections.

8. The method of claim 7, in which a number of connection identifiers (N_CID) field in the UL_MAP_IE identifies a number of connection identifiers (CIDs) aggregated in the UL_MAP_IE.

9. The method of claim 8, in which a set of CIDs follow immediately after the N_CID field.

10. The method of claim 1, further comprising:
inserting, in the single MPDU packet, an enhanced packing subheader (EPSH) in front of each packed MSDU and a generic MAC header (GMH) at the beginning of the single MPDU packet.

11. The method of claim 10, further comprising:
indicating a presence of a packed MSDU in the single MPDU packet using a most significant bit in a type field of the GMH.

12. The method of claim 10, further comprising:
indicating a presence of a packed MSDU in the single MPDU packet using a combination value in a type field of the GMH.

13. The method of claim 10, in which the EPSH includes, sequentially, a one-bit header type (HT) field, a one-bit encryption control (EC) field, a six-bit type field, a one-bit extended subheader field (ESF), a one-bit CRC indicator (CI) field, a two-bit encryption key sequence (EKS) field, a one-bit reserved field, an eleven-bit length (LEN) field, and a sixteen-bit connection identifier (CID) field.

14. The method of claim 13, in which a CRC field is inserted at the end of each packed MSDU.

15. The method of claim 1, further comprising:
inserting, if fragmentation is enabled, an enhanced packing subheader (EPSH) in front of a fragmentation subheader (FSH) of the single MPDU packet.

16. The method of claim 1, further comprising:
packing the MSDU packets of a particular connection of the set of logical connections into a single packed MSDU packet;
inserting a packing subheader (PSH) at the beginning of each MSDU in the packed MSDU packet;
packing the packed MSDU packet and additional MSDU packets of the set of logical connections into a single MPDU packet on the single logical connection; and
inserting, in the single MPDU packet on the single logical connection, an enhanced packing subheader (EPSH) in front of the first PSH in the packed MSDU packet.

* * * * *